United States Patent

Ostroot et al.

[11] 3,715,798
[45] Feb. 13, 1973

[54] ASSEMBLING BELLOWS DAMPER UNIT

[75] Inventors: Gerald F. Ostroot, St. Cloud; Robert H. Torborg, Cold Spring, both of Minn.

[73] Assignee: DeZurik Corporation, Sartell, Minn.

[22] Filed: June 12, 1970

[21] Appl. No.: 57,861

Related U.S. Application Data

[62] Division of Ser. No. 726,089, May 2, 1968, Pat. No. 3,608,436.

[52] U.S. Cl. ............................29/454, 53/12, 73/1 R
[51] Int. Cl. .............................................B23p 19/04
[58] Field of Search..........29/454; 73/1 R; 92/34, 38, 92/36; 53/12, 7

[56] References Cited

UNITED STATES PATENTS

| | | |
|---|---|---|
| 897,730 | 9/1908 | Fulton ..................................92/36 X |
| 1,826,307 | 10/1931 | Farmer..................................92/36 |
| 1,848,319 | 3/1932 | Clifford ...................................53/12 |
| 1,992,605 | 2/1935 | Clifford et al. .........................29/454 |
| 2,418,614 | 4/1947 | Annin.................................92/38 X |
| 3,494,454 | 1/1950 | Ritchie ...................................53/12 |
| 2,764,857 | 10/1956 | Schaefer.................................53/12 |
| 2,837,880 | 6/1958 | Rosenblath et al........................53/7 |
| 2,903,500 | 9/1959 | Newell et al.........................92/38 X |
| 3,061,920 | 11/1962 | Johnson..............................73/1 R X |

Primary Examiner—Charlie T. Moon
Attorney—Wolfe, Hubbard, Leydig, Voit & Osann

[57] ABSTRACT

A liquid-filled force damper unit is described in which a spring metal bellows unit is vacuum-filled with damping fluid to eliminate all air bubbles, and provided with a frangible seal. The unit is assembled to a reservoir which is filled with damping fluid above the level of the seal, which is then broken off, and a relatively flexible reservoir diaphragm is added to allow the unit to be used in any position.

5 Claims, 2 Drawing Figures

PATENTED FEB 13 1973 3,715,798
fig.1.
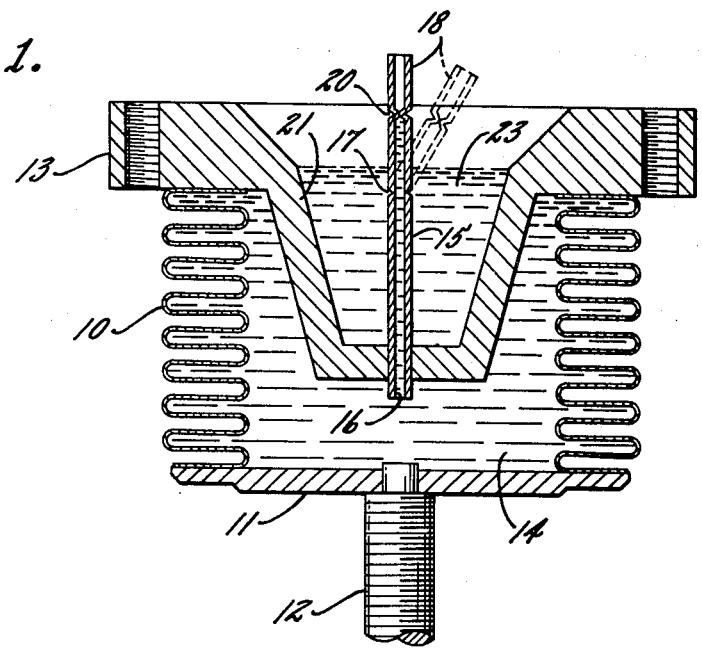
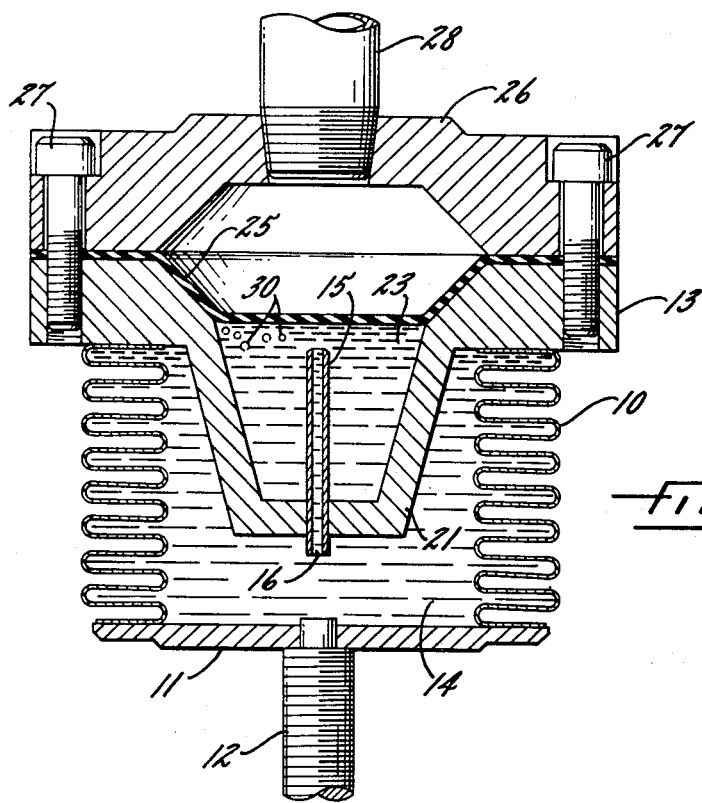
fig.2.

ASSEMBLING BELLOWS DAMPER UNIT

This application is a division of U.S. application Ser. No. 726,089, filed May 2, 1968, now U.S. Pat. No. 3,608,436.

This invention relates to fluid damper units, and in particular to a damper unit which may be operated in any desired attitude without the danger of air being introduced into the fluid-filled bellows chamber.

Bellows fluid damper units are used to damp out mechanical pulsations in measurement and control equipment such as that described by DeZurik in U.S. Pat. No. 3,285,266. The damping effect is furnished by fluid flowing through a calibrated orifice. It is required that the damper unit be solidly filled, that is, entirely filled with damping fluid without air spaces which would be compressible and thus introduce an unwanted delay into the damping action. Such damper units have generally been restricted to operation in a vertical position which places a cumbersome restriction on the design of force balance and feedback transducer units.

Accordingly, it is a principal object of the present invention to provide an improved construction and method of assembly for a bellows damper unit which allows the unit to be installed in any conceivable position which might be required by the apparatus with which it is used. While fulfilling this purpose, it is also necessary that the damper remain filled with an incompressible damping fluid which is free from any gas bubbles which might provide a compressible cushion which would destroy the instantaneous damping response.

Another object of the present invention is to provide a damping unit which may be vacuum-filled while providing room for expansion and contraction of the damping fluid over a wide range of operating temperatures without appreciably altering the spring rate of the bellows system.

A further object is to provide a method of assembly of such a damper unit which allows the unit to be evacuated and filled at the factory, stored or shipped to the customer, and later assembled to its associated equipment without loss of fluid or introduction of air into the fluid chamber.

Other objects and advantages of the invention will be apparent upon reference to the drawings, in which:

FIG. 1 is an elevation in section of a bellows damper unit exemplifying the construction of the present invention; and FIG. 2 is an elevation in section of a complete damper assembly incorporating the unit of FIG. 1.

While the invention will be described in connection with a particular exemplary embodiment and procedure, it will be understood that it is not intended to so limit the invention, but it is instead intended to cover all alternative and equivalent constructions and procedures as may be included within the spirit and scope of the invention as defined by the appended claims.

Referring to the drawings, there is shown in FIG. 1 a bellows unit exemplifying the present invention. It consists of an axially collapsible spring metal bellows 10 connected at one axial end to a cylindrical closure 11 incorporating an attachment means consisting of an operating rod 12. At the opposite end, the bellows 10 is connected to an attachment plate 13 to define a bellows chamber 14. The attachment plate 13 has a central external opening communicating with the bellows chamber 14 in which a flow-restricting capillary tube 15 is received. The bellows 10 may be of stainless steel, bronze, or any other suitable material, and is attached at each end by welding or brazing. The capillary tube 15 has a calibrated bore 16 which serves as a fluid resistance element and furnishes the required damping action through viscous friction when the unit is in operation. The tube 15 is preferably pressed into its opening in the attachment plate 13 and secured by brazing.

As a principal feature of the invention, the capillary tube 15 is constructed in a manner which allows the bellows unit to be filled, assembled and put into operation without the danger of air entering the bellows chamber 14. For this purpose the capillary tube 15 is provided with a frangible connection consisting of a circumferential score line 17 at one end. The length of the capillary bore 16 between the end communicating with the bellows chamber 14 and the score line 17 is carefully determined to provide the required amount of flow resistance with the particular damping fluid to be used. The invention then provides an extension 18 of the capillary tube 15 beyond the score line 17 having a pinched closure 20 or other seal at its terminus.

When filled with damping fluid, the bellows unit of FIG. 1 constitutes a complete sub-assembly which may be stored or shipped. It is preferably filled by evacuating the bellows chamber 14 and allowing atmospheric pressure to draw damping fluid through the capillary opening 16 into the bellows chamber 14, thus filling it solidly without the danger of air pockets or bubbles being trapped within the unit. The capillary extension 18 is then pinched off as at the closure 20 or otherwise sealed, and the bellows unit is then complete. After filling, the oil in the bellows chamber 14 will tend to expand or contract with temperature changes, thus causing minor stresses in the bellows 10 and expanding or contracting the unit slightly in an axial direction. It will be observed that the vacuum-filling technique can still be used because it is unimportant for purposes of storage or shipment to maintain the spring metal bellows 10 in an unstressed condition.

As another feature of the invention, the bellows unit is assembled to form a complete damper in a manner which allows it to be used in any position. In addition, any previous stresses remaining in the spring metal bellows 10 from the filling operation or from temperature changes are safely relieved. When the unit is to be used, it is assembled, with a reservoir 21 defining a reservoir chamber 23 enclosing the still-sealed end of the capillary tube 15 on the opposite side of the bellows chamber 14. This assembly is then turned in a vertical direction with the open end of the reservoir 21 upward, and with the capillary tube 15 and its unbroken extension 18 exposed. The reservoir chamber 23 is then filled with more damping fluid until the frangible score line 17 is seen to be submerged. At this point, the assembler simply grasps the capillary extension 18 between his fingers and snaps off the extension at the score line 17. The seal 20 is thus broken off to leave the capillary tube 15 at the correct length to provide the desired amount of damping action between the bellows chamber 14 and the reservoir chamber 23. The broken capillary extension 18 is discarded.

The damper unit assembly is completed according to the invention by the addition of a flexible diaphragm 25 which is made of rubber or other material such that the diaphragm has a resistance to axial displacement over its normal range of operation which is negligible compared to that of the spring metal bellows 10. In this way thermal expansion or other stresses which would otherwise tend to distort the bellows 10 are easily taken up through displacement of the diaphragm 25, allowing the bellows 10 to remain in its normal unstressed position. Preferably, the flexible diaphragm 25 is assembled by being first flexed convexly downward, with a central portion protruding into the fluid within the reservoir chamber 23. The fluid is thus caused to flow up and out around the periphery of the diaphragm 25 to expel air and any excess fluid. The assembly is completed by securing the edges of the diaphragm with a diaphragm cover 26 which is attached by screws 27 or other suitable means.

The assembly is completed by the addition of an air pressure line 28 into which a pneumatic feedback signal may be introduced if desired.

It will be seen that any small amount of residual air in the form of bubbles 30 left inside the reservoir chamber 23 is unlikely to ever be drawn into the open end of the capillary tube 15. The tube protrudes sufficiently far into the reservoir chamber 23 so that any air bubbles thus trapped will always be displaced upward away from the open end of the capillary tube 15 which is generally in the center of the reservoir volume as shown in FIG. 2.

A damper assembly constructed according to the present invention preserves the advantages of a fluid-filled spring metal bellows damper unit which may be vacuum-filled at the factory. It additionally combines this feature with a freely flexible diaphragm 25 in order to allow the spring metal bellows 10 to adjust itself to relieve internal stresses resulting from the filling operation or from expansion or contraction of the fluid filling. In this way the spring rate of the spring bellows 10 remains unaffected over a range of temperature which might cause considerable volume change in the damping fluid. Further, the pre-filled bellows damper unit can be shipped separately to the job site where it is easily assembled with ordinary hand tools. The finished damper assembly may then be utilized in any orientation without the danger that a small amount of air 30 remaining in the reservoir chamber 23 might enter the bellows chamber 14 through the capillary tube 15. The unit is thus assured of reliable operation under all conditions. The bellows chamber 14 remains solidly filled with damping fluid in all operating positions, isolates the fluid from the pneumatic feedback system, and allows for large changes in operating temperature with little or no variation in damping response.

The following is claimed as invention:

1. A method of constructing a fluid bellows damper unit comprising the steps of forming an axially collapsible bellows having an attachment means at each axial end, sealing one axial end of said bellows and attaching the other axial end to a member forming a fluid chamber within the bellows and on one side of said member, a reservoir chamber on the other side of said member, a conduit communicating with said fluid chamber within the bellows, internal resistance means within the conduit, and a conduit extension extending into said reservoir chamber and communicating with the conduit through a frangible connection, evacuating said fluid chamber, conduit and conduit extension, vacuum-filling said fluid chamber, conduit and conduit extension with damping fluid, sealing the conduit extension, filling said reservoir chamber with damping fluid to a level above said frangible connection of the conduit extension, and breaking off and removing the conduit extension at said frangible connection.

2. The method of claim 1 including the additional step of enclosing said reservoir chamber with a flexible diaphragm having a resistance to displacement over a normal range of operation which is negligible compared to that of the bellows.

3. The method of claim 2 in which the flexible enclosing diaphragm is flexed convexly downward and submerged into the damping fluid of the reservoir to force air and excess fluid out around the peripheral edges thereof, and then secured to the member forming said reservoir chamber.

4. The method of claim 1 wherein said internal resistance means and said conduit extension comprises a single capillary tube.

5. The method of claim 4 wherein said frangible connection is formed by a circumferential score line around said capillary tube.

* * * * *